US012596708B2

(12) United States Patent (10) Patent No.: US 12,596,708 B2
Zare et al. (45) Date of Patent: Apr. 7, 2026

(54) SYSTEMS AND METHODS FOR AUTOMATED CODE GENERATION FOR CALCULATION BASED ON ASSOCIATED FORMAL SPECIFICATIONS

(71) Applicant: Tata Consultancy Services Limited, Mumbai (IN)

(72) Inventors: Amey Zare, Pune (IN); Venkatesh Ramanathan, Pune (IN); Asia Akhtar, Hyderabad (IN); Advaita Abhijit Datar, Pune (IN); Atharv Hemant Shingewar, Pune (IN); Nakshatra Gupta, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 322 days.

(21) Appl. No.: 18/467,276

(22) Filed: Sep. 14, 2023

(65) Prior Publication Data

US 2024/0232188 A1 Jul. 11, 2024

(30) Foreign Application Priority Data

Jan. 5, 2023 (IN) .............................. 202321001225

(51) Int. Cl.
*G06F 16/2452* (2019.01)
*G06F 40/205* (2020.01)
*G06F 40/40* (2020.01)

(52) U.S. Cl.
CPC ...... *G06F 16/24522* (2019.01); *G06F 40/205* (2020.01); *G06F 40/40* (2020.01)

(58) Field of Classification Search
CPC ... G06F 16/24522; G06F 40/40; G06F 40/205
See application file for complete search history.

(56) References Cited

U.S. PATENT DOCUMENTS

2019/0121847 A1* 4/2019 Castañeda-Villagrán ................... G06F 40/18
2020/0192903 A1* 6/2020 Bansal ................ G06F 16/2237

FOREIGN PATENT DOCUMENTS

JP 2009223843 A 10/2009

OTHER PUBLICATIONS

Hoepelman, Tool-assisted Spreadsheet Refactoring and Parsing Spreadsheet Formulas, 2105, thesis, whole document (Year: 2015).*

(Continued)

*Primary Examiner* — Sonia L Gay
(74) *Attorney, Agent, or Firm* — Finnegan, Henderson, Farabow, Garrett & Dunner, LLP

(57) ABSTRACT

Enterprise software relies on numerous types and instances of mathematical and logical calculations for proper functioning, which are formally specified in spreadsheets, known as Calculation Specification (CS) sheets, that provide illustrations of the inputs and outputs of the calculation, and are expressed in inputs and formulae applied on them to get values for outputs. The values for such inputs are retrieved by executing ad hoc queries on respective application's database. Present disclosure provides systems/methods to synthesize code using CS sheets by formulating a Programming By Example (PBE) problem for each input involved in the calculation. A query synthesis technique is then implemented that uses natural language processing and enumerative program synthesis techniques to infer queries corresponding to the PBE problem. These queries are filtered based on whether their output is consistent with expected output in PBE. Finally, the synthesized queries and calculation formulae are translated into a desired target programming language.

6 Claims, 3 Drawing Sheets

(56)  References Cited

OTHER PUBLICATIONS

Navid Yaghmazadeh et al. "SQLizer: Query Synthesis from Natural Language," 2017, Association for Computing Machinery, https://dl.acm.org/doi/pdf/10.1145/3133887.

Ramya Durvasula, "An Interactive Approach to Generating SQL Queries from Natural Language," 2022, Massachusetts Institute of Technology, https://dspace.mit.edu/bitstream/handle/1721.1/143192/Durvasula-rdurvas-meng-eecs-2022-thesis.pdf?sequence=1&isAllowed=y.

* cited by examiner

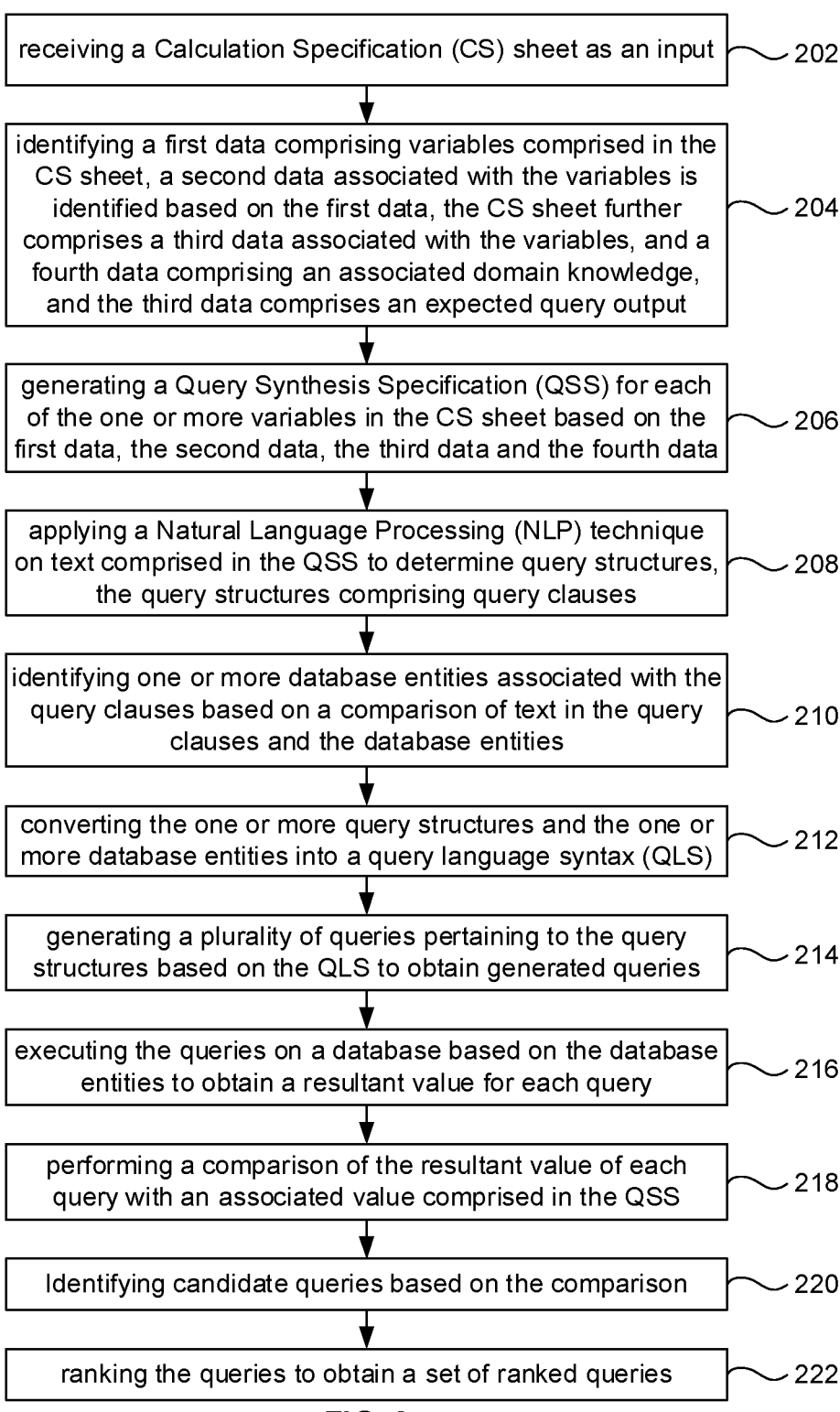

receiving a Calculation Specification (CS) sheet as an input — 202 identifying a first data comprising variables comprised in the CS sheet, a second data associated with the variables is identified based on the first data, the CS sheet further comprises a third data associated with the variables, and a fourth data comprising an associated domain knowledge, and the third data comprises an expected query output — 204 generating a Query Synthesis Specification (QSS) for each of the one or more variables in the CS sheet based on the first data, the second data, the third data and the fourth data — 206 applying a Natural Language Processing (NLP) technique on text comprised in the QSS to determine query structures, the query structures comprising query clauses — 208 identifying one or more database entities associated with the query clauses based on a comparison of text in the query clauses and the database entities — 210 converting the one or more query structures and the one or more database entities into a query language syntax (QLS) — 212 generating a plurality of queries pertaining to the query structures based on the QLS to obtain generated queries — 214 executing the queries on a database based on the database entities to obtain a resultant value for each query — 216 performing a comparison of the resultant value of each query with an associated value comprised in the QSS — 218

Identifying candidate queries based on the comparison — 220 ranking the queries to obtain a set of ranked queries — 222

FIG. 2

SYSTEMS AND METHODS FOR AUTOMATED CODE GENERATION FOR CALCULATION BASED ON ASSOCIATED FORMAL SPECIFICATIONS

PRIORITY CLAIM

This U.S. patent application claims priority under 35 U.S.C. § 119 to: Indian Patent Application No. 202321001225, filed on Jan. 5, 2023. The entire contents of the aforementioned application are incorporated herein by reference.

TECHNICAL FIELD

The disclosure herein generally relates to automated code generation, and, more particularly, to automated code generation for calculation based on associated formal specifications.

BACKGROUND

Numerous mathematical and logical calculations drive the functioning of large enterprise software. In general, these calculations are specified in Calculation Specification (CS) sheets that illustrate the calculations in the form of input and output variables, along with formulae applied on input variables to get the value of output variable(s). Implementing such calculations is a tedious and effort-intensive task. It requires 1) writing database queries to retrieve values of input variables for triggering the calculations, and 2) converting complex mathematical formulae to code in target language.

SUMMARY

Embodiments of the present disclosure present techno-logical improvements as solutions to one or more of the above-mentioned technical problems recognized by the inventors in conventional systems.

For example, in one aspect, there is provided a processor implemented method for automated code generation for calculation based on associated formal specifications. The method comprises receiving, via one or more hardware processors, a Calculation Specification (CS) sheet as an input, identifying, via the one or more hardware processors, a first data comprising one or more variables comprised in the CS sheet, wherein a second data associated with the one or more variables is identified based on the first data, wherein the CS sheet further comprises a third data associ- ated with the one or more variables, and a fourth data comprising an associated domain knowledge, and wherein the third data comprises an expected query output; gener- ating, via the one or more hardware processors, a Query Synthesis Specification (QSS) for each of the one or more variables comprised in the CS sheet based on the first data, the second data, the third data, and the fourth data; applying, via the one or more hardware processors, a Natural Lan- guage Processing (NLP) technique on text comprised in the QSS to determine one or more query structures, wherein the one or more query structures comprises one or more asso- ciated query clauses; identifying, via the one or more hardware processors, one or more database entities associ- ated with the one or more associated query clauses based on a comparison of text in the one or more associated query clauses and the one or more database entities; converting, via the one or more hardware processors, the one or more query structures and the one or more database entities into a query language syntax; generating, via the one or more hardware processors, a plurality of queries pertaining to the one or more query structures based on the query language syntax; executing, via the one or more hardware processors, each query from the plurality of queries, on an associated database based on the one or more database entities to obtain a resultant value for each query from the plurality of queries; performing, via the one or more hardware processors, a comparison of the resultant value of each query with an associated value comprised in the QSS; identifying, via the one or more hardware processors, one or more candidate queries based on the comparison; and ranking, via the one or more hardware processors, the one or more candidate que- ries to obtain a set of ranked queries.

In an embodiment, the one or more query structures are determined by parsing one or more phrases and one or more associated relationships between text phrases for text of (or comprised in) the QSS and mapping the one or more phrases to the one or more associated query clauses.

In an embodiment, the method further comprises validat- ing the set of ranked queries to obtain one or more validated queries, wherein the one or more validated queries serve as one or more intended queries.

In an embodiment, the method further comprises gener- ating a code in a target programming language associated with (i) the one or more intended queries and the one or more variables comprised in the CS sheet, and (ii) one or more calculation formulae specified in the CS sheet.

In an embodiment, the one or more database entities associated with the one or more associated query clauses are identified based on an associated text score and an associ- ated value score.

In another aspect, there is provided a processor imple- mented system for automated code generation for calcula- tion based on associated formal specifications. The system comprises: a memory storing instructions; one or more communication interfaces; and one or more hardware pro- cessors coupled to the memory via the one or more com- munication interfaces, wherein the one or more hardware processors are configured by the instructions to: receive a Calculation Specification (CS) sheet as an input, identify a first data comprising one or more variables comprised in the CS sheet, wherein a second data associated with the one or more variables is identified based on the first data, wherein the CS sheet further comprises a third data associated with the one or more variables, and a fourth data comprising an associated domain knowledge, and wherein the third data comprises an expected query output; generate a Query Synthesis Specification (QSS) for each of the one or more variables comprised in the CS sheet based on the first data, the second data, the third data, and the fourth data; apply a Natural Language Processing (NLP) technique on text com- prised in the QSS to determine one or more query structures, wherein the one or more query structures comprises one or more associated query clauses; identify one or more data- base entities associated with the one or more associated query clauses based on a comparison of text in the one or more associated query clauses and the one or more database entities; convert the one or more query structures and the one or more database entities into a query language syntax; generate a plurality of queries pertaining to the one or more query structures based on the query language syntax; execute each query from the plurality of queries on an associated database based on the one or more database entities to obtain a resultant value for each query from the plurality of queries; perform a comparison of the resultant value of each query with an associated value comprised in the QSS; identify one or more candidate queries based on the comparison; and rank the one or more candidate queries to obtain a set of ranked queries.

In an embodiment, the one or more query structures are determined by parsing one or more phrases and one or more associated relationships between text phrases for the text of (or comprised in) the QSS and mapping the one or more phrases to the one or more associated query clauses.

In an embodiment, the one or more hardware processors are further configured by the instructions to validate the set of ranked queries to obtain one or more validated queries, and wherein the one or more validated queries serve as one or more intended queries.

In an embodiment, the one or more hardware processors are further configured by the instructions to generate a code in a target programming language associated with (i) the one or more intended queries and the one or more variables comprised in the CS sheet, and (ii) one or more calculation formulae specified in the CS sheet.

In an embodiment, the one or more database entities associated with the one or more associated query clauses are identified based on an associated text score and an associated value score.

In yet another aspect, there are provided one or more non-transitory machine-readable information storage mediums comprising one or more instructions which when executed by one or more hardware processors cause automated code generation for calculation based on associated formal specifications by receiving a Calculation Specification (CS) sheet as an input; identifying a first data comprising one or more variables comprised in the CS sheet, wherein a second data associated with the one or more variables is identified based on the first data, wherein the CS sheet further comprises a third data associated with the one or more variables, and a fourth data comprising an associated domain knowledge, and wherein the third data comprises an expected query output; generating a Query Synthesis Specification (QSS) for each of the one or more variables comprised in the CS sheet based on the first data, the second data, the third data, and the fourth data; applying a Natural Language Processing (NLP) technique on text comprised in the QSS to determine one or more query structures, wherein the one or more query structures comprises one or more associated query clauses; identifying one or more database entities associated with the one or more associated query clauses based on a comparison of text in the one or more associated query clauses and the one or more database entities; converting the one or more query structures and the one or more database entities into a query language syntax; generating a plurality of queries pertaining to the one or more query structures based on the query language syntax; executing each query from the plurality of queries, on an associated database based on the one or more database entities to obtain a resultant value for each query from the plurality of queries; performing a comparison of the resultant value of each query with an associated value comprised in the QSS; identifying one or more candidate queries based on the comparison; and ranking the one or more candidate queries to obtain a set of ranked queries.

In an embodiment, the one or more query structures are determined by parsing one or more phrases and one or more associated relationships between text phrases for the text of (or comprised in) the QSS and mapping the one or more phrases to the one or more associated query clauses.

In an embodiment, the one or more instructions which when executed by the one or more hardware processors further cause validating the set of ranked queries to obtain one or more validated queries, wherein the one or more validated queries serve as one or more intended queries.

In an embodiment, the one or more instructions which when executed by the one or more hardware processors further cause generating a code in a target programming language associated with (i) the one or more intended queries and the one or more variables comprised in the CS sheet, and (ii) one or more calculation formulae specified in the CS sheet.

In an embodiment, the one or more database entities associated with the one or more associated query clauses are identified based on an associated text score and an associated value score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 depicts an exemplary flow chart illustrating a method for automated code generation for calculation based on associated formal specifications, using the system of FIG. 1, in accordance with an embodiment of the present disclosure.

DETAILED DESCRIPTION

Figure 1:
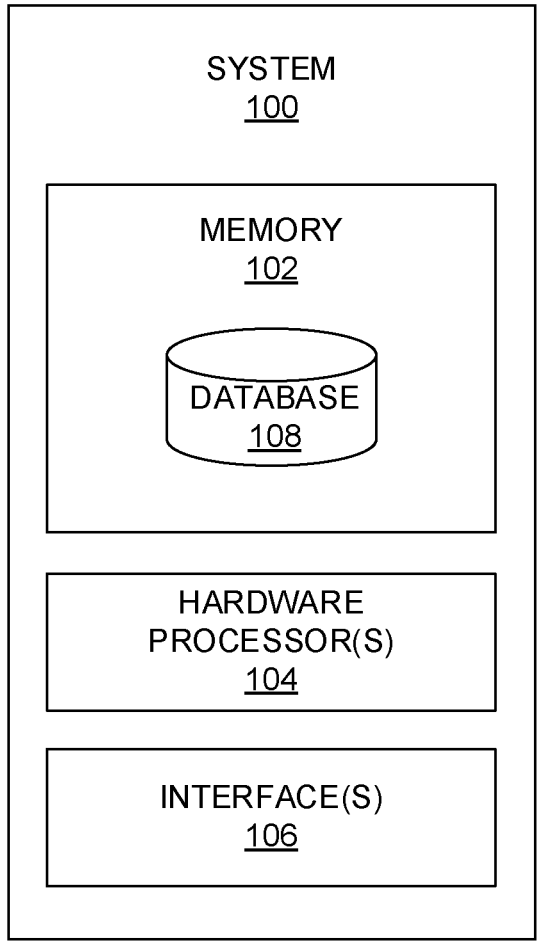
FIG. 1 depicts an exemplary system for automated code generation for calculation based on associated formal specifications, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Program synthesis is the task of automatically finding a program, in the underlying programming language, that satisfies the user intent expressed in the form of specifications (e.g., refer "S. Gulwani, O. Polozov, R. Singh, et al., "Program synthesis," Foundations and Trends® in Programming Languages, vol. 4, no. 1-2, pp. 1-119, 2017."). Various formats for expressing user intent include, but are not limited to, formal logical specifications, informal natural language descriptions and illustrative input-output examples. Writing formal specifications is a tedious task and is sometimes as complex as writing the program itself. Moreover, informal specifications are notorious for being ambiguous and large in volume for the simplest of programs. As an alternative, specifications in the form of input-output examples have proven to be very effective in generating code for string transformation examples (e.g., refer "S. Gulwani, "Automating string processing in spreadsheets using input-output examples," ACM Sigplan Notices, vol. 46, no. 1, pp. 317-330, 2011.""). However, it is extremely difficult to specify all the requirements of large and complex industrial applications using a limited number of input-output examples. Hence, accurately expressing, and interpreting user intent in the form of specifications continues to be a major challenge for program synthesis approaches.

Large enterprise applications, especially in the Banking Financial Services and Insurance (BFSI) industry, rely on numerous types and instances of mathematical and logical calculations for proper functioning. In general, these calculations are formally specified in spreadsheets, known as Calculation Specification (CS) sheets, that provide illustrations of the inputs and outputs of the calculation. These illustrations are expressed in the form of inputs and the formulae applied on them to get values for outputs. The values for such inputs are retrieved by executing ad hoc queries on the database of the respective enterprise application. Present disclosure implements systems and methods to synthesize the code using CS sheets. This is achieved by the systems and methods of the present disclosure by formulating a Programming By Example (PBE) problem for each input involved in the calculation. A query synthesis technique is implemented by the systems and method that use natural language processing and enumerative program synthesis techniques to infer a set of possible queries corresponding to the formulated PBE problem. These queries are filtered based on whether their output is consistent with the expected output in PBE. At the end, the synthesized queries and calculation formulae are translated into the desired target programming language.

In real-world scenarios, implementing code as per given calculation specifications is a tedious task. The variables participating in such calculations reside in large enterprise-size databases that contain hundreds of tables that are part of the complicated database schema. To retrieve their values from the database, proper database queries need to be designed to incorporate the table relationships (primary/foreign keys for joining tables) in the database schema. Moreover, these queries should be written in a parameterized way to ensure data for multiple policies/users can be retrieved on demand, instead of writing separate queries for each policy/user. Lastly, translating the participating formulae to the target programming language becomes difficult when the formulae contain long sequence of mathematical and logical expressions involving multiple variables from multiple CS sheets. Incorporating all these factors while writing the code manually is a challenge, and hence there is a clear need for automating code generation for such calculations corresponding to their formal specifications i.e., CS sheets.

Present disclosure implements systems and methods to synthesize the code corresponding to the specifications in CS sheets. CS sheets are the perfect combination of text and mathematical and logical formulae, and hence CS sheets offer a novel means of specifying user intent for synthesizing code for calculations. Unlike ambiguous natural language specifications, the contents of CS sheets are precise and machine interpretable. As shown in Table 1, CS sheets contain a valid input-output example, i.e., illustration, of the underlying calculations and such illustrations contain a known value for each variable participating in the calculations. The systems and methods of the present disclosure exploit these given values to assist query synthesis by formulating a Query Synthesis Specification (QSS) for each variable in the calculation. In essence, QSS is similar to a Programming By Example (PBE) problem (e.g., refer "S. Gulwani, "Programming by examples," Dependable Software Systems Engineering, vol. 45, no. 137, pp. 3-15, 2016."). The 'input' for QSS is constructed based on all available textual information corresponding to the variable. The 'output' for QSS becomes the value that is expected to be returned by the synthesized query for the given 'input' variable.

After formulating QSS, the system and method of the present disclosure apply Natural Language Processing (NLP) techniques to guess the query structure and database entities needed in the various clauses (SELECT, WHERE etc.) of the query. Next, the systems and method use the query structure and entities to enumerate (e.g., refer "P. Orvalho, M. Terra-Neves, M. Ventura, R. Martins, and V. Manquinho, "Squares: a sql synthesizer using query reverse engineering," Proceedings of the VLDB Endowment, vol. 13, no. 12, pp. 2853-2856, 2020.") all possible queries and execute them on the underlying database. The queries that return the expected 'output' value mentioned in QSS are then ranked, based on heuristics described herein and presented to the end-user for final judgment. Once the database queries for all participating variables are inferred, the calculation formulae are converted to code.

Figure 3:
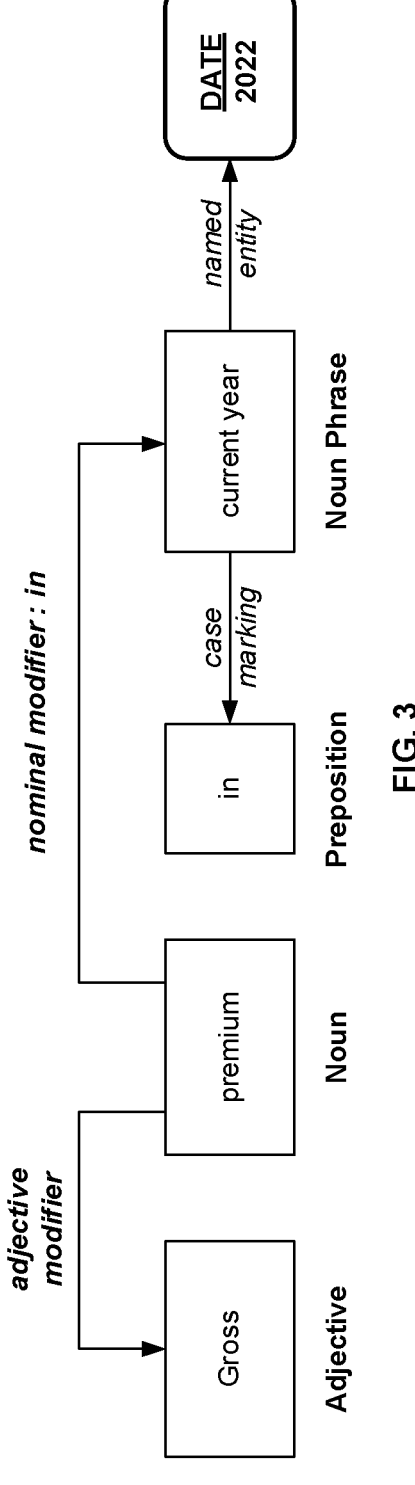
FIG. 3 depicts one or more parsed phrases and their relationships for text of (or comprised in) a Query Synthesis Specification (QSS) formulated for a variable gross premium in current year, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts an exemplary system 100 for automated code generation for calculation based on associated formal specifications, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information Calculation Specification (CS) sheets, Query Synthesis Specification (QSS) for each of the one or more variables comprised in the CS sheet, one or more query structures and associated query clauses, one or more database entities, one or more generated queries, one or more executed queries, candidate queries, one or more ranked queries. The database 108 further comprises one or more validated queries serve as one or more intended queries, generated codes, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow chart illustrating a method for automated code generation for calculation based on associated formal specifications, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2.

At step 202 of the method of the present disclosure, the one or more hardware processors 104 receive a Calculation Specification (CS) sheet as an input. At step 204 of the method of the present disclosure, the one or more hardware processors 104 identify a first data comprising one or more variables comprised in the CS sheet (e.g., for identifying the one or more variables refer "Automated Validation of Insurance Applications against Calculation Specifications"— https://arxiv.org/pdf/2209.03558"). For example, the first data is textual information or variable name associated with the one or more variables, in one example embodiment of the present disclosure. The CS sheet further comprises a second data associated with the one or more variables. The second data is value associated with the one or more variables, in one example embodiment of the present disclosure. The CS sheet further comprises a third data comprises one or more formulae associated with the one or more variables, in one example embodiment of the present disclosure. The second data comprises an expected query output. The CS sheet further comprises a fourth data comprising an associated domain knowledge. The domain knowledge may comprise, but is not limited to, domain keywords, synonyms, dictionary, and the like. Below Table 1 illustrates an exemplary CS sheet:

TABLE 1

Illustration for Policy ID 123456

| | Value |
|---|---|
| Input | |

TABLE 1-continued

Illustration for Policy ID 123456

| | Value |
|---|---|
| Policy value (V) | $500,000.00 |
| Gross premiums in current year (P) | $ 90,000.00 |
| Admin fee base amount (B) | $ 35.00 |
| Waiver threshold (T) | $100,000.00 |
| Max rate of policy value (R) | 0.20% |
| Output | |
| Formula for calculating Admin Fee = If (P < T) then B, else V*R | |
| Admin Fee | $ 35.00 |

At step 206 of the method of the present disclosure, the one or more hardware processors 104 generate a Query Synthesis Specification (QSS) for each of the one or more variables comprised in the CS sheet based on the first data, the second data, the third data, and the fourth data. The above steps 204 and 206 re better understood by way of following description. The system 100 formally defines QSS in the form as shown below:

Input　　Text[Supporting　　Information]{Domain Keywords}=Value, where,

Input Text contains the textual information corresponding to the variable. This information is extracted from the cell adjacent to each input cell/data. Input cells are non-empty cells that 1) contain some value, 2) do not contain a reference to other cells, and 3) are referred by at least one cell in the CS sheet. For the example CS (refer Table 1), the first five cells in second column have values and are referred in last cell of the last row for calculating Admin Fee. Hence, cells first five cells are marked as input cells and the contents adjacent to them i.e., Policy value, Gross premium in current year etc. are considered as Input Text for respective QSS of each input variable.

[Supporting Information] captures additional information, apart from the Input Text, that can be used in synthesizing the query for the variable. This typically includes information that is unique to each illustration, such as policy ID, customer ID, etc. in BFSI domain. In the example, CS (refer Table 1), the indicated values for all variables are taken from the policy 123456. Hence, Policy ID=123456 will be considered as Supporting Information in the QSS of all input variables in Table 1.

{Domain Keywords} is a field of QSS that contains all domain-specific information that denotes the context and/or the calculation type in which the variable is being used. These keywords are included to assist query synthesis by narrowing down the search for relevant database entities that are needed in query clauses. The example CS (refer Table 1) belongs to insurance domain and the calculation name, i.e., Admin Fee, is considered as Domain Keyword/phrase in the QSS of all input variables.

Value contains the value(s) of the variable, which is(are) provided in the illustration. Value is considered as the 'output' of the QSS. This is determined by extracting contents of all input cells, as per the process for finding Input Text described herein. For the example CS refer Table 1), the input cells (first five cells of value column) and hence, their contents i.e., 99000, 90000, etc. are considered as Value for QSS formulation. Using the formal definition described above, the QSS for each variable in Table 1 is as follows.

1) Policy value [Policy ID=123456] {Admin Fee}=99000

2) Gross premium in current year [Policy ID=123456] {Admin Fee}=90000, and the like.

Formulation of such an input-output specification (QSS) from a calculation specification (CS sheet) is implemented by the systems and methods of the present disclosure.

Referring to steps of FIG. 2, at step 208 of the method of the present disclosure, the one or more hardware processors 104 apply, a Natural Language Processing (NLP) technique (NLP technique as known in the art) on text comprised in the QSS to determine one or more query structures. The one or more query structures comprises one or more associated query clauses. The one or more query structures are determined by parsing one or more phrases and one or more associated relationships between text phrases for the text of (or comprised in) the QSS and mapping the one or more phrases to the one or more associated query clauses. The above step 206 is better understood by way of following description.

Once the QSS is formulated, the desired database query is synthesized. The structure of the desired query can be guessed by parsing the Input Text using any standard natural language parser (e.g., refer "C. D. Manning, M. Surdeanu, J. Bauer, J. R. Finkel, S. Bethard, and D. McClosky, "The stanford corenlp natural language processing toolkit," in Proceedings of 52nd annual meeting of the association for computational linguistics: system demonstrations, pp. 55-60, 2014."). FIG. 3, with reference to FIGS. 1 through 2, depicts one or more parsed phrases and their relationships for the text of (or comprised in) the QSS formulated for the variable Gross premium in current year, in accordance with an embodiment of the present disclosure. Based on such phrases and their relationships, the structure of the query can be guessed by mapping related phrases to respective query clauses through natural language semantics, as explained below.

In Gross premium in current year, the subject noun is premium and hence it is considered in SELECT clause. As per natural language semantics, the subject noun's adjectival modifier Gross is indicating that the total amount of all premiums needs to be retrieved through the desired query.

Hence, the SELECT clause must have SUM(premium). Next, the main noun's nominal modifier current year (linked via preposition in) should be considered in WHERE clause. The phrase current year intuitively indicates the ongoing year i.e., 2022, so the WHERE clause can contain year=2022. However, since date-related information is generally mentioned in columns with date data type, the phrase current year can also relate to a date on or between 1 Jan. 2022 and 31 Dec. 2022. Therefore, the WHERE clause can also contain 1 Jan. 2022<=date<=31 Dec. 2022, leading to possibilities of multiple query structures. Lastly, the Supporting Information in QSS i.e., Policy ID=123456 becomes part of the WHERE clause by default as the given illustration contains values from policy 123456. Hence, based on the information in QSS for the variable Gross premium in current year and natural language semantics, the query structures shown in Table 1 can be considered for query synthesis. Table 2 depicts the QSS, and the one or more query structures determined which have the one or more query clauses as referred in steps 206 and 208.

Referring to FIG. 2, at step 210 of the method of the present disclosure, the one or more hardware processors 104 identify one or more database entities associated with the one or more associated query clauses based on a comparison of text in the one or more associated query clause and the one or more database entities. The one or more database entities associated with the one or more associated query clauses are identified based on an associated text score and an associated value score. The above step of 210 is better understood by way of following description:

Once the one or more query structures are ready, the database entities i.e., table and column names corresponding to each query clause need to be identified. As shown in Table 2, every query clause contains either text or value or both. More specifically, Table 2 depicts query structures for 'Gross premium in current year' from the CS shown in Table 1. To infer the intended column(s) for the query clause text, the system and method compare it with all table/column names and description provided in the database schema. Table 3 illustrates an exemplary database schema.

TABLE 2

| ID | Clause | LHS | | Operator | RHS | |
| --- | --- | --- | --- | --- | --- | --- |
| | | Aggregate | Variable | | Aggregate | Variable |
| 1 | SELECT | SUM | Premium | | | |
| | WHERE_1 | | Policy ID | = | | 123456 |
| | WHERE_2 | | Date | >= | | 1 Jan. 2022 |
| | WHERE_3 | | Date | <= | | 31 Dec. 2022 |
| 2 | SELECT | SUM | Premium | | | |
| | WHERE_1 | | Policy ID | = | | 123456 |
| | WHERE_2 | | Year | = | | 2022 |

TABLE 3

| CUSTOMER_DETAILS | POLICY_DETAILS | POLICY_WITHDRAW_RECEIPT | POLICY_PREMIUM_RECEIPT |
| --- | --- | --- | --- |
| CUST_ID | POLICY_ID | WITHDRAW_RECEIPT_ID | PREM_RECEIPT_ID |
| CUST_FIRST_NAME | PRODUCT_ID | POLICY_ID | POLICY_ID |
| CUST_SURNAME | CUST_ID | WITHDRAW_AMT | PREM_AMT |
| CONTACT_NO | POLICY_VALUE | WITHDRAW_DT | PREM_PAID_DT |
| . . . | . . . | . . . | . . . |

TABLE 3-continued

| PRODUCT_DETAILS | PROD_ADMIN_FEE | . . . | PROD_SERVICE_CHARGE_DIM |
|---|---|---|---|
| PRODUCT_CD | PAF_ID | . . . | SERVICE_CHARGE_ID |
| EFF_START_DT | EFF_START_ID | . . . | PRODUCT_CD |
| EFF_END_DT | PRODUCT_CD | . . . | RIDER_CODE |
| PROD_TYPE | ADMIN_CHARGE | . . . | MAX_SERVICE_CHARGE |
| WAIVER_ELIGIBILITY | RATE | . . . | MAX_RATE |
| FINAL_RATE | WAIVER_THRESHOLD | . . . | |
| . . . | . . . | . . . | . . . |

The identified columns can then be assigned a text matching score by using standard text matching utilities (e.g., refer "R. Haldar and D. Mukhopadhyay, "Levenshtein distance technique in dictionary lookup methods: An improved approach," arXiv preprint arXiv: 1101.1232, 2011.", and "difflib—helpers for computing deltas." https://docs.python.org/3/library/difflib.html, 2022. Accessed: 2022 Nov. 20.") to quantify how similar these columns are to the query clause text. In case a query clause contains a value and operator, for example, 'year=2022' (clause WHERE 2 for query structure ID 2 in Table 2), a clause predicate can be created using them. Columns that contain at least one value satisfying the clause predicate can be considered candidate columns. The system and method have observed that the accuracy of identifying database columns improves if such value matching is done along with conventional text matching. All columns that satisfy value matching can then be given a representative value matching score. Later, all columns can be sorted based on their combined value and text matching scores to get a ranked list of candidate columns. For example, Table 4 shows the ranked list of candidate columns (also referred as identified one or more database entities, as per database schema in Table 3, for the QSS shown in Table 2.

PRODUCT_DETAILS, 'RATE' from PROD_ADMIN_FEE, and 'MAX_RATE' from PROD_SERVICE_CHARGE_DIM gets significantly higher text matching score due to the sub-string 'rate' in their name. It is assumed by the system 100 and the method that all three columns contain the value '2%', the column 'RATE' from PROD_ADMIN_FEE will be ranked highest as its table name is very similar to the provided Domain Keywords 'Admin Fee'.

Referring to steps of FIG. 2, at step 212 of the method of the present disclosure, the one or more hardware processors 104 convert the one or more query structures and the one or more database entities into a query language syntax. The above step of 212 is better understood by way of following description.

Once the ranked list of database columns is identified for all query clauses of all query structures or the one or more database entities are identified, the collected information is converted to the desired query language syntax. For this, firstly high-ranked tables or the one or more database entities are identified by considering the sum of value and text matching scores computed of all query clauses for each QSS. Next, SELECT queries corresponding to all identified query structures are enumerated (e.g., refer "P. Orvalho, M. Terra-Neves, M. Ventura, R. Martins, and V. Manquinho, "Squares: a sql synthesizer using query reverse engineering," Proceedings of the VLDB Endowment, vol. 13, no. 12, pp. 2853-2856, 2020."), as per SQL grammar (e.g., refer "C.

TABLE 4

| Clause | Rank | Table | Column | Overall score | Value Score | Text Score |
|---|---|---|---|---|---|---|
| Policy ID = | 1 | POLICY_DETAILS | POLICY_ID | 55 | 25 | 30 |
| 123456 | 2 | POLICY_WITHDRAW_RECEIPT | POLICY_ID | 55 | 25 | 30 |
| | 3 | POLICY_PREM_RECEIPT | POLICY_ID | 55 | 25 | 30 |
| | 4 | CUSTOMER_DETAILS | CUST_ID | 38 | 25 | 13 |

Apart from the Input_Text, the Domain_Keywords included in QSS also play a vital role in the identification of database entities for query clauses. The system and method of the present disclosure explain this through the example of the variable 'Max Rate of Policy Value' (cell "Max rate of policy value (R)" in Table 1) for the database schema in Table 4. The SELECT clause for this variable, as per described query structure generation approach, is 'MAX (Rate)'. As a result, the columns 'FINAL_RATE' from Wang, A. Cheung, and R. Bodik, "Synthesizing highly expressive sql queries from input-output examples," in Proceedings of the 38th ACM SIGPLAN Conference on Programming Language Design and Implementation, pp. 452-466, 2017."), by considering columns from the aforementioned high-ranked tables. Thus, instead of iterating over a complete database, the system 100 and the method first iterate over only high-ranked tables. Table 5 depicts the one or more query structures and the one or more database entities being converted into the query language syntax.

TABLE 5

| Text ID | Structure ID | Query |
|---------|--------------|-------|
| 1 | 1 | SELECT SUM(POLICY_PREM_RECEIPT.PREM_AMT) FROM POLICY_PREM_RECEIPT WHERE POLICY_PREM_RECEIPT.POLICY_ID = 123456; |
| 1 | 1 | SELECT SUM(POLICY_PREM_RECEIPT.POLICY_PREM_RECEIPT_ID) FROM POLICY_PREM_RECEIPT WHERE POLICY_PREM_RECEIPT.POLICY_ID = 123456; |
| 1 | 1 | SELECT SUM(POLICY_PREM_RECEIPT.PREM_PAID_DT) FROM POLICY_PREM_RECEIPT WHERE POLICY_PREM_RECEIPT.POLICY_ID = 123456; |
| 1 | 1 | SELECT SUM(POLICY_PREM_RECEIPT.PREM_AMT) FROM POLICY_PREM_RECEIPT WHERE POLICY_PREM_RECEIPT.PREM_PAID_DT >= '2022 Jan. 1' AND POLICY_PREM_RECEIPT.POLICY_ID = 123456; |
| 1 | 1 | SELECT SUM(POLICY_PREM_RECEIPT.POLICY_PREM_RECEIPT_ID) FROM POLICY_PREM_RECEIPT WHERE POLICY_PREM_RECEIPT.PREM PAID_DT >= '2022 Jan. 1' AND POLICY_PREM_RECEIPT.POLICY ID = 123456; |
| 1 | 1 | SELECT SUM(POLICY_PREM_RECEIPT.PREM_PAID_DT) FROM POLICY_PREM_RECEIPT WHERE POLICY_PREM_RECEIPT.PREM_PAID_DT >= '2022 Jan. 1' AND POLICY_PREM_RECEIPT.POLICY_ID = 123456; |
| . . . | . . . | . . . |

Referring to steps of FIG. 2, at step 214 of the method of the present disclosure, the one or more hardware processors 104 generate a plurality of queries pertaining to the one or more query structures based on the query language syntax. At step 216 of the method of the present disclosure, the one or more hardware processors 104 execute each query from the plurality of queries on an associated database (e.g., refer the database schema of Table 3) based on the one or more database entities to obtain a resultant value for each query from the plurality of queries. At step 218 of the method of the present disclosure, the one or more hardware processors 104 perform a comparison of the resultant value of each query with an associated value comprised in the QSS. At step 220 of the method of the present disclosure, the one or more hardware processors 104 identify one or more candidate queries based on the comparison. At step 222 of the method of the present disclosure, the one or more hardware processors 104 rank the one or more candidate queries to obtain a set of ranked queries. The above steps of 214 through 222 are better understood by way of following description.

Each enumerated query is then executed on the database and the resulting value is compared with the Value mentioned in the formulated QSS. If the values match, the query is marked as a candidate query. In case, the system 100 and the method find that there are multiple such candidate queries, these are then ranked based on confidence scores. This score is calculated for each candidate query based on query contents, such as the number of WHERE clauses, rank of the participating table, the number of JOIN operations, etc. At the end, a list of top N candidate queries, ranked on the basis of confidence score, the intended query is marked (e.g., by one or more end users). In other words, the set of ranked queries are validated to obtain one or more validated queries. The one or more validated queries serve as one or more intended queries. The goal of the method of the present disclosure is to provide very few queries for final review/ marking, otherwise, the end-user may prefer spending time manually writing the intended queries, instead of reviewing a large number of synthesized queries. Table 6 depicts exemplary queries being executed and values of which being compared for match or mismatch for identifying the one or more candidate queries (refer steps 214 till 220).

TABLE 6

| Text ID | Structure ID | Query | Query Output | Matched with QSS? |
|---------|--------------|-------|--------------|-------------------|
| 1 | 1 | SELECT SUM(POLICY_PREM_RECEIPT.PREM_AMT) FROM POLICY_PREM_RECEIPT WHERE POLICY_PREM_RECEIPT.POLICY_ID = 123456; | 75000 | NO |
| . . . | . . . | . . . | . . . | . . . |

TABLE 6-continued

| Text ID | Structure ID | Query | Query Output | Matched with QSS? |
|---|---|---|---|---|
| 1 | 1 | SELECT SUM(POLICY_PREM_RECEIPT.PREM_AMT) FROM POLICY_PREM_RECEIPT WHERE POLICY_PREM_RECEIPT.PREM_PAID_DT >= '2022 Jan. 1' AND POLICY_PREM_RECEIPT.PREM_PAID_DT <= '2022 Dec. 31' AND POLICY_PREM_RECEIPT.POLICY_ID = 123456; | 90000 | YES |
| . . . | . . . | . . . | . . . | . . . |
| 1 | 2 | SELECT SUM(POLICY_PREM_RECEIPT.PREM_AMT) FROM POLICY_PREM_RECEIPT WHERE POLICY_PREM_RECEIPT.POLICY_ID = 123456; | 60000 | NO |
| . . . | . . . | . . . | . . . | . . . |

Table 7 depicts exemplary ranked queries based on the one or more candidate queries (refer steps 222)

TABLE 7

| Text ID | Input Text | Supporting Information | Domain Keywords | Value | Rank | Query |
|---|---|---|---|---|---|---|
| 1 | Gross Premium in current year | Policy ID = 123456 | Admin Fee | 90000 | 1 | SELECT SUM(POLICY_PREM_RECEIPT.PREM_AMT) FROM POLICY_PREM_RECEIPT WHERE POLICY_PREM RECEIPT.PREM_PAID_DT >= '2022 Jan. 1' AND POLICY_PREM_RECEIPT.PREM_PAID_DT <= '2022 Dec. 31' AND POLICY_PREM_RECEIPT.POLICY_ID = 123456; |
| | | | | | 2 | SELECT SUM(POLICY_PREM_RECEIPT.PREM_AMT) FROM POLICY_PREM_RECEIPT WHERE YEAR(POLICY_PREM_RECEIPT.PREM_PAID_DT) = '2022' AND POLICY_PREM_RECEIPT.POLICY_ID = 123456; |
| | | | | | 3 | SELECT SUM(POLICY_PREM_RECEIPT.PREM_AMT) FROM POLICY_PREM_RECEIPT WHERE POLICY_PREM_RECEIPT.PREM_PAID_DT >= '2022 Jan. 1' AND POLICY_PREM_RECEIPT.POLICY_ID = 123456; |
| | | | | | 4 | SELECT SUM(POLICY_PREM_RECEIPT.PREM_AMT) FROM POLICY_PREM_RECEIPT JOIN POLICY_DETAILS ON POLICY_PREM_RECEIPT.POLICY_ID = POLICY_DETAILS.POLICY_ID WHERE POLICY_PREM_RECEIPT.PREM_PAID_DT >= '2022 Jan. 1' AND POLICY_PREM_RECEIPT.PREM_PAID_DT <= '2022 Dec. 31' AND POLICY_DETAILS.POLICY_ID = 123456; |

TABLE 7-continued

| Text ID | Input Text | Supporting Information | Domain Keywords | Value | Rank | Query |
|---|---|---|---|---|---|---|
| | | | | | 5 | SELECT SUM(POLICY_PREM_RECEIPT.PREM_AMT) FROM POLICY_PREM_RECEIPT JOIN POLICY_DETAILS ON POLICY_PREM_RECEIPT.POLICY_ID = POLICY_DETAILS.POLICY_ID WHERE YEAR(POLICY_PREM_RECEIPT.PREM_PAID_DT) = '2022' AND POLICY_DETAILS.POLICY_ID = 123456; |
| | | | | | 6 | SELECT SUM(POLICY_PREM_RECEIPT.PREM_AMT) FROM POLICY_PREM_RECEIPT JOIN POLICY_DETAILS ON POLICY_PREM_RECEIPT.POLICY_ID = POLICY_DETAILS.POLICY_ID WHERE POLICY_PREM_RECEIPT.PREM_PAID_DT >= '2022 Jan. 1' AND POLICY_DETAILS.POLICY_ID = 123456; |

In case the aforementioned query synthesis process does not result in any candidate query, or the end-user finds that none of the candidate queries is the expected query, the system 100 and the method generate all possible queries by exhaustively enumerating the entire SQL grammar (e.g., refer "C. Wang, A. Cheung, and R. Bodik, "Synthesizing highly expressive sql queries from input-output examples," in Proceedings of the 38th ACM SIGPLAN Conference on programming Language Design and Implementation, pp. 452-466, 2017.") based on the underlying database schema. This is done to ensure that the ultimately intended query is generated and used for fine-tuning and improving the method of the present disclosure through machine learning techniques (stored in the memory 102 and invoked for execution as applicable/desired).

Once the intended queries are obtained, the one or more hardware processors 104 generate a code in a target programming language associated with (i) the one or more intended queries and the one or more variables comprised in the CS sheet, and (ii) one or more calculation formulae specified in the CS sheet. The above step of code generation is better understood by way of following description. Once the database queries (also referred as 'intended queries' or 'validated queries' and interchangeably used herein) are synthesized and finalized for all variables in the CS sheet, the code corresponding to (or associated with) these queries and the formulae in the CS sheet (e.g., 'Admin Fee' in cell indicating "=If (P<T) then B, else V*R" of Table 1) can be generated in the desired programming language using state-of-the-art code translation techniques (e.g., for state-of-the-art code translation techniques refer ""XIcalculator: Ms excel formulas to python." https://excelexamples.com/post/xlcalculator-converts-ms-excel-formulas-to-python-and-evaluates-them/, 2022. Accessed: 2022 Nov. 20."). The generated code by the system 100 and method of the present disclosure is illustrated by way of example below:

Sample Code Generated if Target Language is Python:

```
import os, sys
#Function synthesized for Gross premium in current year
def getGrossPremium(policyID):
    cursor=database.cursor( )
```

```
    cursor.execute("SELECT SUM(POLICY_PREM_RE-
        CEIPT.PREM_AMT)
FROM POLICY_PREM_RECEIPT WHERE
POLICY_PREM_RECEIPT.PREM_PAID_DT>='2022-
    01-01' AND
POLICY_PREM_RECEIPT.PREM_PAID_DT<='2022-
    12-31' AND
POLICY_PREM_RECEIPT.POLICY_ID=123456")
    result=cursor.fetchall( )
    return result
    #Functions for other variables i.e. V, B, T, R will be
        synthesized similar to the one shown above
#Function synthesized for calculating Admin Fee
def getAdminFee(policyID):
    V=getPolicyValue(policyID)
    P=getGrossPremium(policyID)
    B=getAdminFeeBase(policyID)
    T=getWaiverThreshold(policyID)
    R=getMaxRatePolicyValue(policyID)
        return B if P<T else V*R
```

As mentioned above, the challenge of program synthesis lies in two main components: the diversity of user intent and the intractability of the program space. The user intent can be expressed in a variety of ways, including examples from conventional research work (e.g., refer "S. Gulwani, "Programming by examples," Dependable Software Systems Engineering, vol. 45, no. 137, pp. 3-15, 2016."), traces, natural language (e.g., refer "A. Desai, S. Gulwani, V. Hingorani, N. Jain, A. Karkare, M. Marron, and S. Roy, "Program synthesis using natural language," in Proceedings of the 38th International Conference on Software Engineering, pp. 345-356, 2016."), partial programs (e.g., refer "O. Bastani, X. Zhang, and A. Solar-Lezama, "Synthesizing queries via interactive sketching," arXiv preprint arXiv: 1912.12659, 2019."), and so on. In the present disclosure, the system and method specify user intent in the form of Calculation Specification (CS) sheets. A CS sheet represents the mathematical and logical relationship between the inputs and outputs of a program. Essentially, it acts as a concise and precise form of functional specification for the desired program. Furthermore, end users, who are not programming experts, may find providing examples to be more approachable and natural.

Another challenge for program synthesis is the intractability of program space. The method of the present disclosure described herein for query synthesis reduces this problem significantly. The system 100 and the method described herein use known techniques (e.g., refer "F. Li and H. V. Jagadish, "Nalir: an interactive natural language interface for querying relational databases," in Proceedings of the 2014 ACM SIGMOD international conference on Management of data, pp. 709-712, 2014." and "N. Yaghmazadeh, Y. Wang, I. Dillig, and T. Dillig, "Sqlizer: query synthesis from natural language," Proceedings of the ACM on Programming Languages, vol. 1, no. OOPSLA, pp. 1-26, 2017."— also referred as N. Yaghmazadeh et al.) to generate query structure. Later, N. Yaghmazadeh et al. uses an iterative refinement loop that alternates between type-directed synthesis and automated repair. However, the system and method implement a heuristic-based query synthesis technique, as described above, that significantly reduces the search space.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, via one or more hardware processors, a Calculation Specification (CS) sheet as an input;

identifying, via the one or more hardware processors, a first data comprising one or more variables comprised in the CS sheet, wherein a second data associated with the one or more variables is identified based on the first data, wherein the CS sheet further comprises a third data associated with the one or more variables, and a fourth data comprising an associated domain knowledge, and wherein the third data comprises an expected query output;

generating, via the one or more hardware processors, a Query Synthesis Specification (QSS) for each of the one or more variables comprised in the CS sheet based on the first data, the second data, the third data, and the fourth data;

applying, via the one or more hardware processors, a Natural Language Processing (NLP) technique on text comprised in the QSS to determine one or more query structures, wherein the one or more query structures comprises one or more associated query clauses, wherein the one or more query structures are determined by parsing one or more phrases and one or more associated relationships between text phrases for the text of the QSS and mapping the one or more phrases to the one or more associated query clauses;

identifying, via the one or more hardware processors, one or more database entities associated with the one or more associated query clauses based on a comparison of text in the one or more associated query clause and the one or more database entities;

converting, via the one or more hardware processors, the one or more query structures and the one or more database entities into a query language syntax;

generating, via the one or more hardware processors, a plurality of queries pertaining to the one or more query structures based on the query language syntax;

executing, via the one or more hardware processors, each query from the plurality of queries, on an associated database based on the one or more database entities to obtain a resultant value for each query from the plurality of queries;

performing, via the one or more hardware processors, a comparison of the resultant value of each query with an associated value comprised in the QSS;

identifying, via the one or more hardware processors, one or more candidate queries based on the comparison;

ranking, via the one or more hardware processors, the one or more candidate queries to obtain a set of ranked queries;

validating the set of ranked queries to obtain one or more validated queries, wherein the one or more validated queries serve as one or more intended queries; and generating a code in a target programming language associated with (i) the one or more intended queries and the one or more variables comprised in the CS sheet, and (ii) one or more calculation formulae specified in the CS sheet.

2. The processor implemented method of claim 1, wherein the one or more database entities associated with the one or more associated query clauses are identified based on an associated text score and an associated value score.

3. A system, comprising:

a memory storing instructions;

one or more communication interfaces; and one or more hardware processors coupled to the memory via the one or more communication interfaces, wherein the one or more hardware processors are configured by the instructions to:

receive a Calculation Specification (CS) sheet as an input;

identify a first data comprising one or more variables comprised in the CS sheet, wherein a second data associated with the one or more variables is identified based on the first data, wherein the CS sheet further comprises a third data associated with the one or more variables, and a fourth data comprising an associated domain knowledge, wherein the third data comprises an expected query output;

generate a Query Synthesis Specification (QSS) for each of the one or more variables comprised in the CS sheet based on the first data, the second data, the third data, and the fourth data;

apply a Natural Language Processing (NLP) technique on text comprised in the QSS to determine one or more query structures, wherein the one or more query structures comprises one or more associated query clauses, wherein the one or more query structures are determined by parsing one or more phrases and one or more associated relationships between text phrases for the text of the QSS and mapping the one or more phrases to the one or more associated query clauses;

identify one or more database entities associated with the one or more associated query clauses based on a comparison of text in the one or more associated query clause and the one or more database entities;

convert the one or more query structures and the one or more database entities into a query language syntax;

generate a plurality of queries pertaining to the one or more query structures based on the query language syntax;

execute each query from the plurality of queries on an associated database based on the one or more database entities to obtain a resultant value for each query from the plurality of queries;

perform a comparison of the resultant value of each query with an associated value comprised in the QSS;

identify one or more candidate queries based on the comparison;

rank the one or more candidate queries to obtain a set of ranked queries;

validate the set of ranked queries to obtain one or more validated queries, and wherein the one or more validated queries serve as one or more intended queries; and generate a code in a target programming language associated with (i) the one or more intended queries and the one or more variables comprised in the CS sheet, and (ii) one or more calculation formulae specified in the CS sheet.

4. The system of claim 3, wherein the one or more database entities associated with the one or more associated query clauses are identified based on an associated text score and an associated value score.

5. One or more non-transitory machine-readable information storage mediums comprising one or more instructions which when executed by one or more hardware processors cause:

receiving a Calculation Specification (CS) sheet as an input;

identifying a first data comprising one or more variables comprised in the CS sheet, wherein a second data associated with the one or more variables is identified based on the first data, wherein the CS sheet further comprises a third data associated with the one or more variables, and a fourth data comprising an associated domain knowledge, and wherein the third data comprises an expected query output;

generating a Query Synthesis Specification (QSS) for each of the one or more variables comprised in the CS sheet based on the first data, the second data, the third data, and the fourth data;

applying a Natural Language Processing (NLP) technique on text comprised in the QSS to determine one or more query structures, wherein the one or more query structures comprises one or more associated query clauses, wherein the one or more query structures are determined by parsing one or more phrases and one or more associated relationships between text phrases for the text of the QSS and mapping the one or more phrases to the one or more associated query clauses;

identifying one or more database entities associated with the one or more associated query clauses based on a comparison of text in the one or more associated query clause and the one or more database entities;

converting the one or more query structures and the one or more database entities into a query language syntax;

generating a plurality of queries pertaining to the one or more query structures based on the query language syntax;

executing each query from the plurality of queries, on an associated database based on the one or more database entities to obtain a resultant value for each query from the plurality of queries;

performing a comparison of the resultant value of each query with an associated value comprised in the QSS;

identifying one or more candidate queries based on the comparison;

ranking the one or more candidate queries to obtain a set of ranked queries;

validating the set of ranked queries to obtain one or more validated queries, wherein the one or more validated queries serve as one or more intended queries; and generating a code in a target programming language associated with (i) the one or more intended queries and the one or more variables comprised in the CS sheet, and (ii) one or more calculation formulae specified in the CS sheet.

6. The one or more non-transitory machine-readable information storage mediums of claim 5, wherein the one or more database entities associated with the one or more associated query clauses are identified based on an associated text score and an associated value score.

\* \* \* \* \*